(12) United States Patent
Wang et al.

(10) Patent No.: US 10,769,848 B1
(45) Date of Patent: Sep. 8, 2020

(54) 3D OBJECT RECONSTRUCTION USING PHOTOMETRIC MESH REPRESENTATION

(71) Applicant: Adobe, Inc., San Jose, CA (US)

(72) Inventors: Oliver Wang, Seattle, WA (US);
Vladimir Kim, Seattle, WA (US);
Matthew Fisher, Palo Alto, CA (US);
Elya Shechtman, Seattle, WA (US);
Chen-Hsuan Lin, Pittsburgh, PA (US);
Bryan Russell, San Francisco, CA (US)

(73) Assignee: Adobe, Inc., San Jose, CA (US)

( * ) Notice: Subject to any disclaimer, the term of this patent is extended or adjusted under 35 U.S.C. 154(b) by 0 days.

(21) Appl. No.: 16/421,729

(22) Filed: May 24, 2019

(51) Int. Cl.
| | |
|---|---|
| *G06T 17/20* | (2006.01) |
| *G06T 15/00* | (2011.01) |
| *G06N 3/08* | (2006.01) |
| *B29C 64/386* | (2017.01) |
| *B33Y 50/00* | (2015.01) |
| *G06T 7/55* | (2017.01) |

(52) U.S. Cl.
CPC .......... *G06T 17/20* (2013.01); *B29C 64/386* (2017.08); *B33Y 50/00* (2014.12); *G06N 3/08* (2013.01); *G06T 7/55* (2017.01); *G06T 15/005* (2013.01); *G06T 2200/04* (2013.01); *G06T 2200/08* (2013.01)

(58) Field of Classification Search
None
See application file for complete search history.

(56) References Cited

U.S. PATENT DOCUMENTS

| 2015/0123967 A1* | 5/2015 | Quinn | G06T 7/75 345/420 |
|---|---|---|---|
| 2016/0005221 A1* | 1/2016 | Morwald | G06T 5/005 348/222.1 |

OTHER PUBLICATIONS

Simon Baker et al., "Lucas-Kanade 20 Years On: A Unifying Framework", International Journal of Computer Vision, 2004, pp. 221-255, vol. 56(3).
Thibault Groueix et al., "A Papier-Mache Approach to 3D Surface Generation", Computer Vision Foundation, 2018, pp. 216-224.

* cited by examiner

*Primary Examiner* — Vu Nguyen
(74) *Attorney, Agent, or Firm* — Finch & Maloney PLLC

(57) ABSTRACT

Techniques are disclosed for 3D object reconstruction using photometric mesh representations. A decoder is pretrained to transform points sampled from 2D patches of representative objects into 3D polygonal meshes. An image frame of the object is fed into an encoder to get an initial latent code vector. For each frame and camera pair from the sequence, a polygonal mesh is rendered at the given viewpoints. The mesh is optimized by creating a virtual viewpoint, rasterized to obtain a depth map. The 3D mesh projections are aligned by projecting the coordinates corresponding to the polygonal face vertices of the rasterized mesh to both selected viewpoints. The photometric error is determined from RGB pixel intensities sampled from both frames. Gradients from the photometric error are backpropagated into the vertices of the assigned polygonal indices by relating the barycentric coordinates of each image to update the latent code vector.

20 Claims, 9 Drawing Sheets

3D OBJECT RECONSTRUCTION USING PHOTOMETRIC MESH REPRESENTATION

FIELD OF THE DISCLOSURE

This disclosure relates generally to the field of digital image processing, and more particularly, to techniques for three-dimensional (3D) object reconstruction from image sequences using photometric mesh representations.

BACKGROUND

A 3D image of an object can be generated from one or more two-dimensional (2D) images using various reconstruction techniques. For example, multi-view geometric reconstruction methods, such as structure-from-motion (SfM) and simultaneous localization and mapping (SLAM), recover point clouds as the underlying 3D structure of red-green-blue (RGB) image sequences, often with high accuracy. Point clouds, however, lack inherent 3D spatial structure for efficient reasoning. For this reason, at least in some scenarios, mesh representations are more desirable than point clouds for 3D object reconstruction. A 3D mesh is a structural representation, or model, of a polyhedral object, where the three-dimensional reference points of polygons (x, y, and z) in the model define the height, width and depth of various object surfaces. Meshes are significantly more compact as data structures than point clouds because meshes have inherent geometric structures defined by point connectivity, while they also represent continuous surfaces that are useful for many applications, such as texture mapping. However, as will be further explained herein, meshing point clouds is a difficult and computationally expensive problem, and existing solutions for meshing point clouds are impractical.

Another limitation of multi-view geometric methods is that they rely on hand-designed features and can be fragile when assumptions about those features are invalid for a given image. This happens especially in texture-less regions or with illumination variations. By contrast, data-driven approaches include prior knowledge of shapes that are likely to be in a given image (also referred to as shape priors) for solving ill-posed 3D reconstruction problems. Such data-driven approaches have been applied to 3D prediction tasks using single images. However, these approaches can only reliably reconstruct from the known space of training examples used for learning, resulting in a limited ability to generalize to unseen (non-learned) data.

Therefore, complex and non-trivial issues associated with 3D object reconstruction remain due to the limitations of these existing techniques.

BRIEF DESCRIPTION OF THE DRAWINGS

The accompanying drawings are not intended to be drawn to scale.

DETAILED DESCRIPTION

Figure 1:
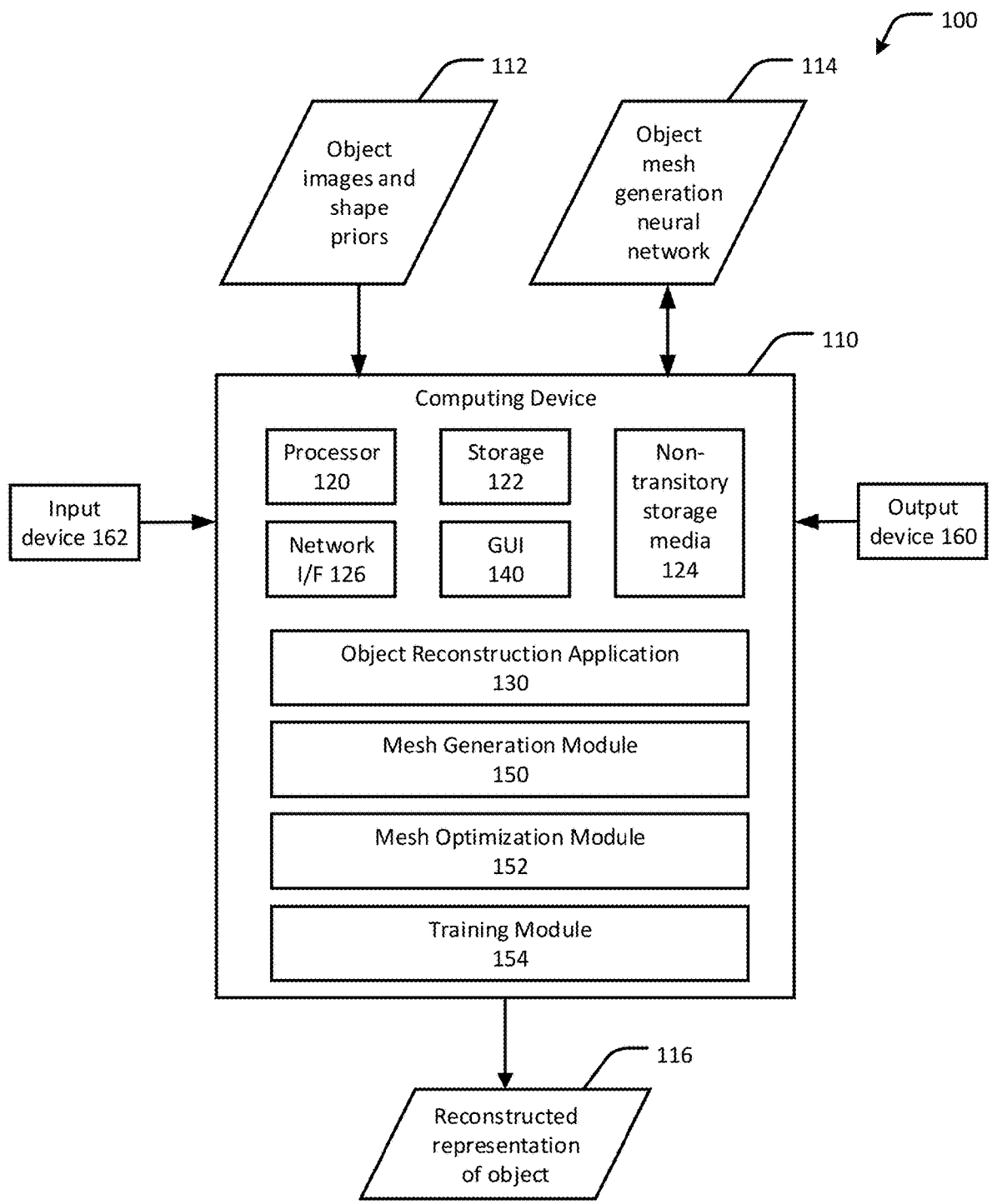
FIG. 1 shows an example system for 3D object reconstruction using photometric mesh representations, in accordance with an embodiment of the present disclosure.

Techniques are disclosed for 3D object reconstruction using photometric mesh representations. A photometric loss function augments a deep learning-based reconstruction system, such as a neural network, which generates 3D meshes directly from images of objects. The photometric loss function enables optimization of the system, so that the resulting optimized system reconstructs a 3D mesh that is consistent with the images. The disclosed techniques are particularly beneficial, as they allow for efficiently predicting scene meshes directly from multi-view images, which is different from producing 3D point clouds from the images and then subsequently meshing those points.

In an embodiment, a decoder, such as a neural network, is pretrained to transform a set of points sampled from 2D patches of representative objects into a set of 3D polygonal meshes. Given an image sequence or video of an object as an input in the form of RGB images paired with associated camera matrices, an image frame with the object centered is selected either manually or automatically. The selected frame is fed into an encoder to get an initial latent code vector as an output. For each frame and camera pair from the sequence, a polygonal (e.g., triangular) mesh is rendered at the given viewpoints through mesh rasterization, which produces a rasterized map with polygonal (e.g., triangular) face indices.

The mesh is optimized by first selecting pairs of consecutive frames from the image sequence. Next, for each pair of frames, a virtual viewpoint is created by taking the bisection of the corresponding rotations and camera centers. The mesh is then rasterized to obtain a depth map from the virtual viewpoint. The depth map can be expressed as a set of 3D points that lie on the surface of the mesh. Next, the 2D mesh projections are aligned by projecting the set of 3D points from the depth map to both selected viewpoints. The photometric error is determined from the difference between the RGB pixel intensities sampled from both frames. Thus, a photometric loss function can be computed as a pixel-wise intensity error between both synthesized images. Gradients from the photometric error are then backpropagated into the vertices of the assigned polygonal (e.g., triangular) indices by relating the barycentric coordinates of each image to update the latent code vector. Therefore, the pretrained decoder, when optimized over the photometric loss function, can reconstruct a 3D mesh that is consistent with objects appearing in the sequence of images. With this technique, an initial mesh prediction is optimized by using the RGB information with the corresponding camera viewpoints. The mesh can be used, for example, as a 3D stock asset in a virtual reality (VR) or augmented reality scene when displayed as an output to a VR or stereo display. Numerous variations will be appreciated in light of this disclosure.

General Overview

As previously explained, there are non-trivial problems associated with reconstructing images of 3D objects from 2D images using existing multi-view geometric methods and data-driven approaches. For instance, while point clouds can recover 3D structures with high accuracy, mesh representations are typically more useful than point clouds for inserting objects into an augmented reality (AR) scene and for other depth-based effect applications. Furthermore, point cloud-based representations do not occlude virtual objects behind foreground scene elements due to noise in the depth and possible holes that appear in the scene. Therefore, 3D point clouds must be converted into a 3D mesh to determine whether an object is occluded. Nevertheless, meshing point clouds is a difficult problem, and existing solutions are impractical.

To this end, techniques for 3D object reconstruction using photometric mesh representations are disclosed. More specifically, a mesh is predicted directly from multi-view images in combination with known 3D object models learned by a neural network and other shape priors. A photometric consistency loss function augments the deep learning-based object-mesh reconstructions. Focusing on object instances for improved 3D reconstruction, the disclosed techniques use shape priors, which are pre-defined object shapes used to reconstruct realistic geometry with incomplete observations, and multi-view geometric constraints to refine mesh predictions on the input 2D image sequences. The shape priors can be obtained, for example, from one or more pretrained neural networks. This approach has the benefit of dense reconstruction with object semantics from the learned shape priors, which is not possible from the traditional pipelines of multi-view stereo (MVS) followed by surface meshing. This approach also generalizes to variations in unseen objects by utilizing multi-view geometry to enforce observation consistency across viewpoints.

Mesh reconstruction can be obtained from color (for example, RGB) image sequences using photometric optimization. Here, this is posed as a piece-wise image alignment problem of individual mesh faces. Gradients of the photometric error are derived with respect to mesh vertices, allowing the mesh to deform accordingly. An advantage of this photometric mesh optimization is its non-reliance on any a priori known depth or mask information, which is otherwise a necessary condition for reconstructing objects from image sequences. This permits practical usage of shape prior-based 3D mesh reconstruction aligned with RGB sequences, such as for applications including robotics (e.g., accurate localization for autonomous driving), computer graphics (e.g., physical simulation and texture synthesis), and virtual reality.

In more detail, the disclosed techniques incorporate aspects of multi-view object reconstruction, mesh reconstruction, shape prior learning, and image alignment to maximize multi-view photometric consistency by constraining mesh deformation.

Multi-view calibration and reconstruction are used to estimate camera coordinates using 2D keypoint matching, a process known as SLAM or SfM, followed by dense reconstruction methods such as MVS and meshing. Other 3D reconstruction techniques variously utilize multiple-view consistency between 2D mask projections, depth rendering, and general 2D observations. These methods all utilize forms of 2D supervision that are easier to acquire than 3D CAD models, which are relatively limited in quantity. In contrast to existing 3D reconstruction techniques, some embodiments of the present disclosure utilize both geometric and image-based prior constraints, which overcomes some common multi-view limitations, such as missing observations, and texture-less regions.

Meshes can be reconstructed from 3D models (e.g., computer aided design or CAD models), from approximated gradients for 2D mask optimization, and using 2D supervision of textures, masks, and 2D keypoints. In contrast to existing mesh reconstruction techniques, some embodiments of the present disclosure use photometric cues across image viewpoints rather than relying on masks or keypoints. Furthermore, some embodiments of the present disclosure are optimized for 3D meshes using 2D photometric cues. A larger amount of perturbation noise can be accounted for by optimizing over a latent feature vector, or shape code, instead of over mesh vertices, making such embodiments more suitable for practical uses.

A plane and primitive prior have been used for the challenging task of multi-view scene reconstruction. Although a geometric primitive prior does not need to learn from an object dataset, the resulting reconstructions can differ significantly from the target geometry when the object is not well represented by the chosen primitives. Pretrained neural networks representing shape priors, in combination with point clouds, can be used instead of primitives to improve 3D reconstruction. Typically, with neural networks, object masks are needed as additional constraints on the input images during optimization to isolate the objects from the background. However, generating accurate object masks is a non-trivial task. By contrast, some embodiments of the present disclosure eliminate the need for mask supervision by regularizing the optimized latent feature vectors from the pretrained neural network to ensure that the feature vectors remain within a trusted region of the feature space and to prevent the meshes from falling to degenerate solutions. Previously, shape priors have also been utilized for finding shape correspondences, where the network learns the deformation field from a template shape to match 3D observations. By contrast, some embodiments of the present disclosure instead directly optimize the latent feature vectors to match 2D cues from multiple viewpoints, and do not require a known shape template for the object.

For image alignment, mesh optimization is posed as multiple image alignment problems of mesh faces, which is solved by optimizing a latent feature vector from the encoder of a deep network, rather than the vertices themselves.

System Architecture

FIG. 1 shows an example system 100 for three-dimensional (3D) object reconstruction using photometric mesh representations, in accordance with an embodiment of the present disclosure. The system 100 includes a computing device 110 having a processor 120, an Object Reconstruction Application 130, and a graphical user interface (GUI) 140. The GUI 140 includes a display and user input device. The processor 120 of the computing device 110 is configured to execute the following modules, each of which is described in further detail below: Mesh Generation Module 150, Mesh Optimization Module 152, and Training Module 154. The computing device 110 is further configured to receive, as inputs, at least two images of an object and data representing shape priors 112, and an object mesh generation neural network 114. The network 114 provides, to the computing device 110, object models representing shape priors learned by the network using machine learning techniques. The images 112 represent a series of images or a sequence of video frames of the object taken from differing viewing angles to be processed by the system 100. The computing device 110 is further configured to produce, as an output, a reconstructed representation 116 of the object that is based at least in part on the object images and shape priors 112 and the object mesh generation neural network 114. The reconstructed representation 116 can, for example, include a digital image or a series of digital images that virtually replicates, in 3D, the object appearing in the images 112, or data that can be used to physically replicate the object in 3D, such as via a 3D printer, such as variously described in this disclosure. Any number of standard or proprietary digital images (e.g., JPEG, bitmap, PNG, TIFF, QuickTime VR, and PANO) can be used for the object images 112 and images generated from the reconstructed representation of the object 116. Each of the modules 150, 152, and 154 can be used in conjunction with each other for 3D object reconstruction using photometric mesh representations, with the reconstruction process producing the reconstructed representation 116 or other data associated with the reconstructed representation 116, such as a structural representation (e.g., a polygon mesh) of the object that can be used to generate one or more visual images of the object in 3D or 3D printings of the object.

The computing device 110 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The computing device 110 includes one or more storage devices 122 or non-transitory computer-readable media 124 having encoded thereon one or more computer-executable instructions or software for implementing techniques as variously described in this disclosure. The storage devices 122 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 122 may include other types of memory as well, or combinations thereof. The storage device 122 may be provided on the computing device 110 or provided separately or remotely from the computing device 110. The non-transitory computer-readable media 124 may include, but are not limited to, one or more types of hardware memory, non-transitory tangible media (for example, one or more magnetic storage disks, one or more optical disks, one or more USB flash drives), and the like. The non-transitory computer-readable media 124 included in the computing device 110 may store computer-readable and computer-executable instructions or software for implementing various embodiments. The computer-readable media 124 may be provided on the computing device 110 or provided separately or remotely from the computing device 110.

The computing device 110 also includes at least one processor 120 for executing computer-readable and computer-executable instructions or software stored in the storage device 122 or non-transitory computer-readable media 124 and other programs for controlling system hardware. Virtualization may be employed in the computing device 110 so that infrastructure and resources in the computing device 110 may be shared dynamically. For example, a virtual machine may be provided to handle a process running on multiple processors so that the process appears to be using only one computing resource rather than multiple computing resources. Multiple virtual machines may also be used with one processor. Network interface (I/F) 126 can be any appropriate network chip or chipset which allows for wired or wireless connection between the device 110 and a communication network (not shown) and other computing devices and resources.

A user may interact with the computing device 110 through an output device 160, such as a screen or monitor, including an augmented reality display device, which may display one or more user interfaces provided in accordance with some embodiments. The output device 160 may also display other aspects, elements or information or data associated with some embodiments. The computing device 110 may include input or input/output devices 162 for receiving input from a user, for example, a keyboard, a joystick, a game controller, a pointing device (e.g., a mouse, a user's finger interfacing directly with a touch-sensitive display device, etc.), or any suitable user interface, including an AR headset. The computing device 110 may include other suitable conventional I/O peripherals. The computing device 110 includes or is operatively coupled to various suitable devices for performing one or more of the aspects as variously described in this disclosure.

The computing device 110 may run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 110 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as the modules 150, 152, 154, the GUI 140, or any combination of these, is implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 100, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Methodology

Figure 2A:
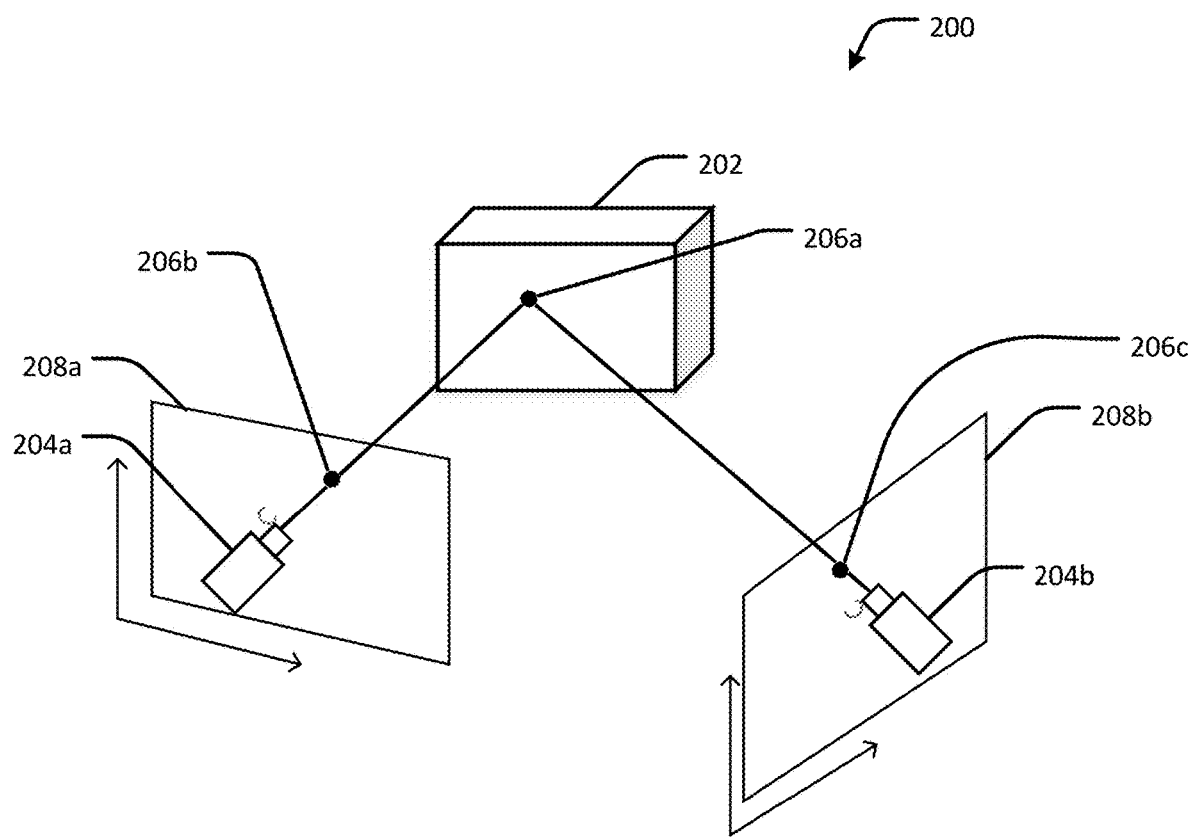
FIG. 2A shows an example general overview of the principle of multi-view 3D reconstruction using photometric mesh representations, in accordance with an embodiment of the present disclosure.

FIG. 2A shows an overview of the principle of multi-view 3D reconstruction. A scene 200 includes an object 202. Two or more cameras 204a, 204b obtain images of a point 206a on the surface of the object 202 from different viewing angles. Each camera 204a, 204b has an associated reference frame 208a, 208b onto which the point 206a is projected, indicated at 206b and 206c. Given the multiple projections 206b, 206c of the same point 206a onto the multiple images, a 3D position of the point 206a is the intersection of the two projection rays, a technique referred to as triangulation. The 3D position of the point 206a can be triangulated from the known locations and orientations of the cameras 204a, 204b relative to the object 202. However, finding the correspondence between the projections 206b and 206c, which are needed to identify the 3D position of the point 206a, is a difficult problem.

Figure 2B:
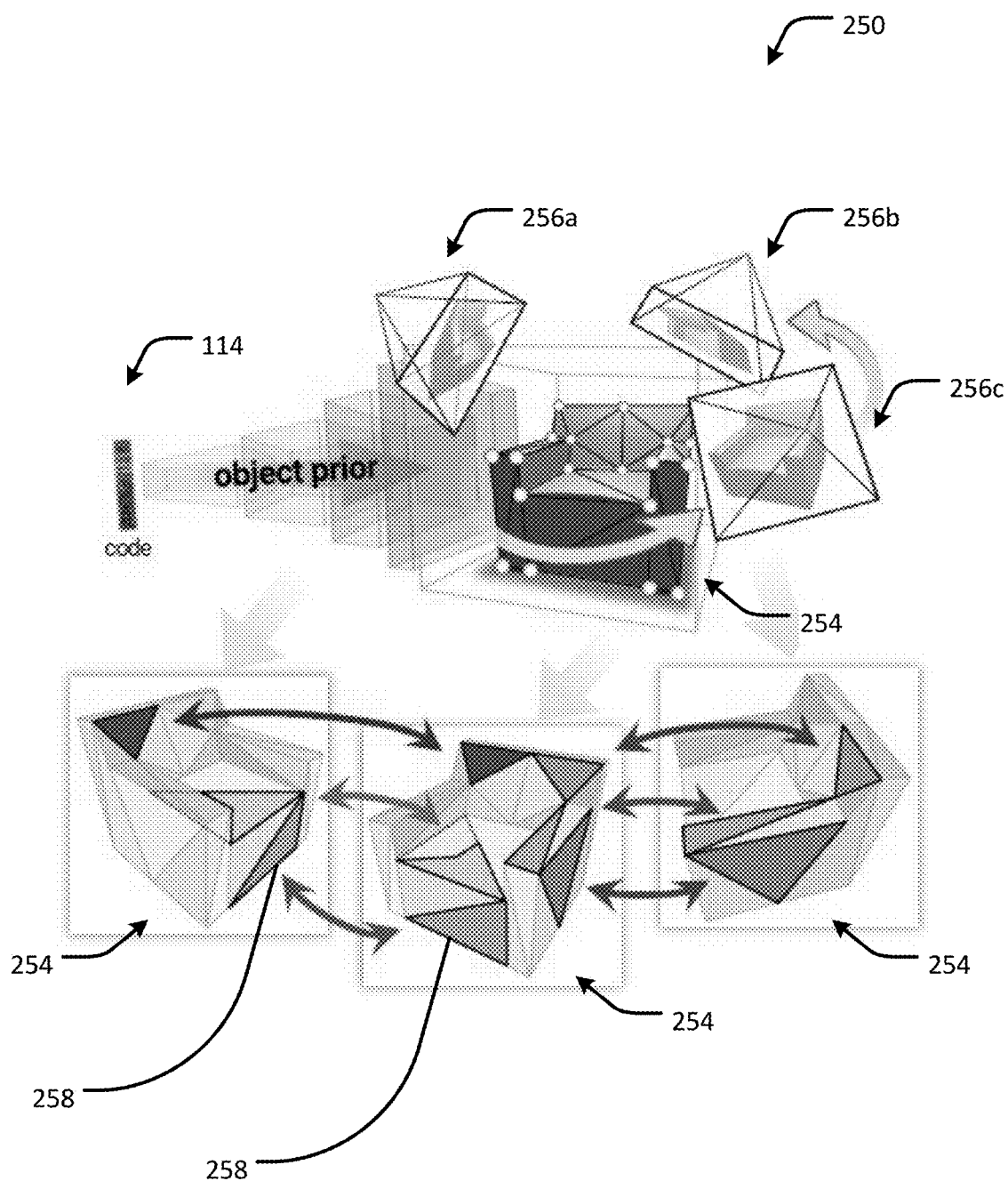
FIG. 2B shows an example detailed overview of a technique for 3D object reconstruction using photometric mesh representations, in accordance with an embodiment of the present disclosure.

FIG. 2B shows an example overview 250 of a technique for 3D object reconstruction using photometric mesh representations that optimize for object meshes while maximizing multi-view photometric consistency, in accordance with an embodiment of the present disclosure. Three-dimensional object reconstruction is posed as a piece-wise image alignment problem in which the mesh deformation is constrained over a shape prior parameterized by a neural network. The disclosed techniques utilize the pretrained object mesh generation network 114 as the shape prior, and camera matrices are obtained from the object image sequence 112 using SfM methods. Triangular meshes can be used, although the disclosed techniques are applicable to any polygonal mesh type, as will be appreciated in view of this disclosure.

Piece-Wise Image Alignment

Dense 2D projections from a 3D mesh of an object 254, and thus the polygonal faces 258 of the mesh 254, are all presumed to be consistent across camera viewpoints 256a, 256b, 256c. Therefore, the problem of 3D mesh alignment becomes a collection of piece-wise 2D image alignment subproblems of each triangular face 258 for each projection. For a triangular mesh with N vertices, denoted as a set of vertices $V \in \mathbb{R}^{N \times 3}$, a photometric objective function $\mathcal{L}_{phot}$ can be decomposed as:

$$\mathcal{L}_{phot}(V) = \sum_j \mathcal{L}_{phot}^{(j)}(V_j), \quad (1)$$

where $\mathcal{L}^{(j)}_{phot}$ is part of the photometric loss contributed by triangle j with its vertices written as $V_j \in \mathbb{R}^{3 \times 3}$ tied together by a predefined mesh topology if shared by multiple faces.

2D image alignment can be achieved by solving for a parameterized warp $\mathcal{W}(\cdot)$ on a source image $I_S$ against a template image $I_T$. According to an embodiment, this solution can be written as a per-triangle photometric objective function:

$$\mathcal{L}_{phot}^{(j)}(V_j) = \sum_{i: x_i \in \mathcal{X}_j} \|I_S(x'_i) - I_T(x_i)\|_1, \quad (2)$$

where $x'_i = \mathcal{W}(x_i; V_j)$ is the warped pixel coordinate where $I_S$ is sampled at, and $\mathcal{X}_j$ is the set of visible pixel coordinates within the projection range of triangular face j. The warp function $\mathcal{W}(\cdot)$, parameterized by the 3D triangle vertices $V_j$, are a back-projection $\pi^{-1}(\cdot;\cdot,\Omega_T)$ from the template view onto triangle j composed with a reprojection $\pi(\cdot;\Omega_S)$ onto the source view, governed by camera matrices $\Omega_T$ and $\Omega_S$, respectively. We can thus rewrite as $$x'_i = \pi(\pi^{-1}(x_i; V_j; \Omega_T); \Omega_S) \forall i: x_i \in \mathcal{X}_j. \quad (3)$$

Back-projection $\pi^{-1}(\cdot)$ typically requires depth to be known, such as in some SLAM problems, but in accordance with an embodiment, back-projection can be directly solved through ray-triangle intersection for a given $V_j$. In the case where multiple triangles intersect, the closest triangles are selected using mesh rendering techniques such as rasterization or ray-tracing. This determines which vertices the photometric gradients from each pixel should contribute and backpropagate to. This also retains true differentiability without the need to resort to approximate gradients.

Mesh Alignment Using Virtual Templates

In accordance with an embodiment, $\mathcal{X}_j$ represents the visible pixel coordinates inside the projection of triangle j (for example, triangle 258). When aligning mesh projections, $\mathcal{X}_j$ varies with the triangle vertices $V_j$. This is unlike existing image alignment techniques where the template coordinates X are constant, and warps are asymmetrically applied only to the source image. To account for simultaneous variability of paired imaging with respect to $V_j$, image gradients from both images are used to maintain stability during optimization.

The photometric objective can be reformulated to:

$$\mathcal{L}_{phot}^{(j)}(V_j) = \sum_{i: x_i \in \mathcal{X}_j} \|I_1(x'_i) - I_2(x''_i)\|_1, \quad (4)$$

where $x'_i = \pi(\pi^{-1}(x_i; V_j, \Omega_{VT}); \Omega_1)$, $x''_i = \pi(\pi^{-1}(x_i; V_j, \Omega_{VT}); \Omega_2)$.

Here, $\Omega_{VT}$ is the camera matrix at a virtual template view. Virtual templates are used because the reprojection of $x_i$ in Equation (3) back to itself can be written as:

$$x'_i = \pi(\pi^{-1}(x_i; V_j; \Omega_T); \Omega_T) = x_i \forall x_i. \quad (5)$$

By re-projecting the coordinates from a third frame, virtual templates allow correct gradient computation $$\frac{\partial I}{\partial V_j} = \frac{\partial I}{\partial x'_i} \frac{\partial x'_i}{\partial V_j}$$

from both images, where $$\frac{\partial I}{\partial x'_i}$$

can be obtained through differentiable image sampling. In accordance with an embodiment, $\Omega_T$ is chosen to be the bisection between $\Omega_1$ and $\Omega_2$, although it will be understood that $\Omega_T$ can be arbitrarily chosen.

Mesh Optimization

Optimizing for a 3D mesh with N vertices involves solving for 3N degrees of freedom (DoFs), which typically becomes an under-constrained problem when N is large. Therefore, regularization is used to ensure object mesh deformations are well-behaved during optimization. According to an embodiment, deep neural networks can be used as shape priors and optimize over a latent feature vector, or shape code, z. The vertices V can thus be re-parameterized as V=g(z), where g represents a neural network. This has the advantage of allowing the mesh to deform within a learned shape space, while avoiding the many local minima that exist with direct vertex optimization.

Mesh predictions from neural networks lie in a canonical coordinate system independent of the world coordinate system recovered by SfM. A coarse alignment of these coordinate systems can be computed from cheap annotation of rough correspondences. To more accurately align the meshes to the RGB sequences, a 3D similarity transform refinement $\mathcal{T}(\cdot)$ on the mesh vertices $V=[v_1, v_2, \ldots, v_N]^T$ can be optimized as:

$$v'_i = \mathcal{T}(v_i;\theta) = \exp(s)R(\omega)v_i + t + \forall i, \quad (6)$$

where $\theta=[s, \omega, t]^T \in \mathbb{R}^7$ are the 7-DoF parameters and R is a 3D rotation matrix parameterized by $\omega$. The exponential on s is taken to ensure positivity. This parameterization is used to place extra constraints (e.g., scale).

Despite neural networks being effective priors, the latent feature vector space is reasonable only within the span captured by the training data. To avoid object meshes from falling to degenerate solutions, an extra penalty is imposed on the code z to ensure it stays within a trust region of the initial code $z_0$ (extracted from a pretrained image encoder f), defined as:

$$\mathcal{L}_{code} = \|z - z_0\|_2^2.$$

Additionally, a scale penalty $\mathcal{L}_{scale} = -s$ is added to encourage the mesh to expand, since the mesh shrinking to infinitesimal is a trivial solution with zero photometric error.

The full optimization loss function can be represented by:

$$\min_{z,\theta} \mathcal{L}_{phot}(z, \theta) + \lambda_{code} \cdot \mathcal{L}_{code}(z) + \lambda_{scale} \cdot \mathcal{L}_{scale}(\theta), \quad (7)$$

where $\lambda_{code}$ and $\lambda_{scale}$ are the penalty weights of the additional regularization. All functions are fully differentiable with respect to the photometric error.

Example Method

Figure 3:
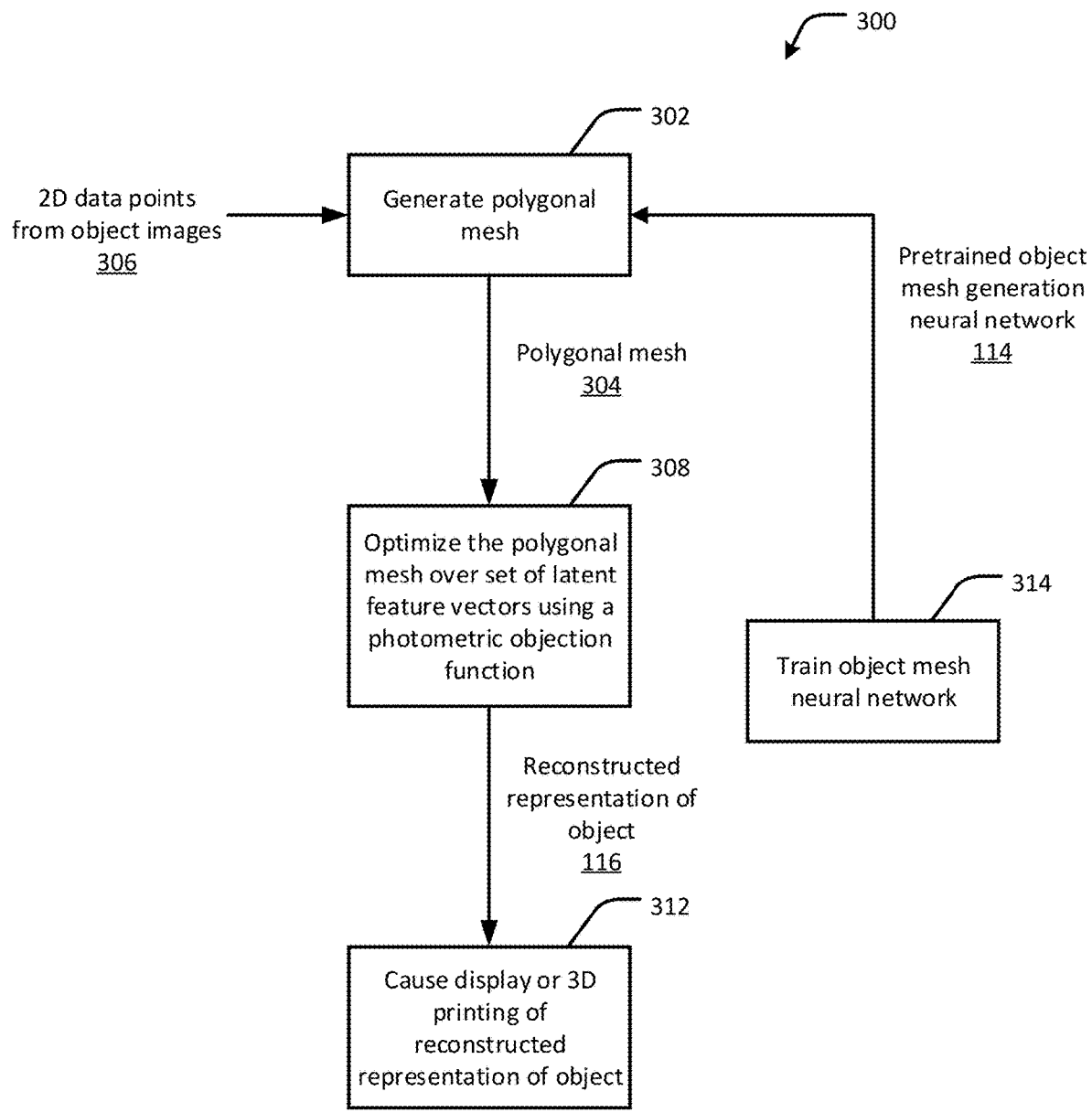
FIGS. 3-5 are flow diagrams of an example process for 3D object reconstruction using photometric mesh representations, in accordance with an embodiment of the present disclosure.
Figure 4:
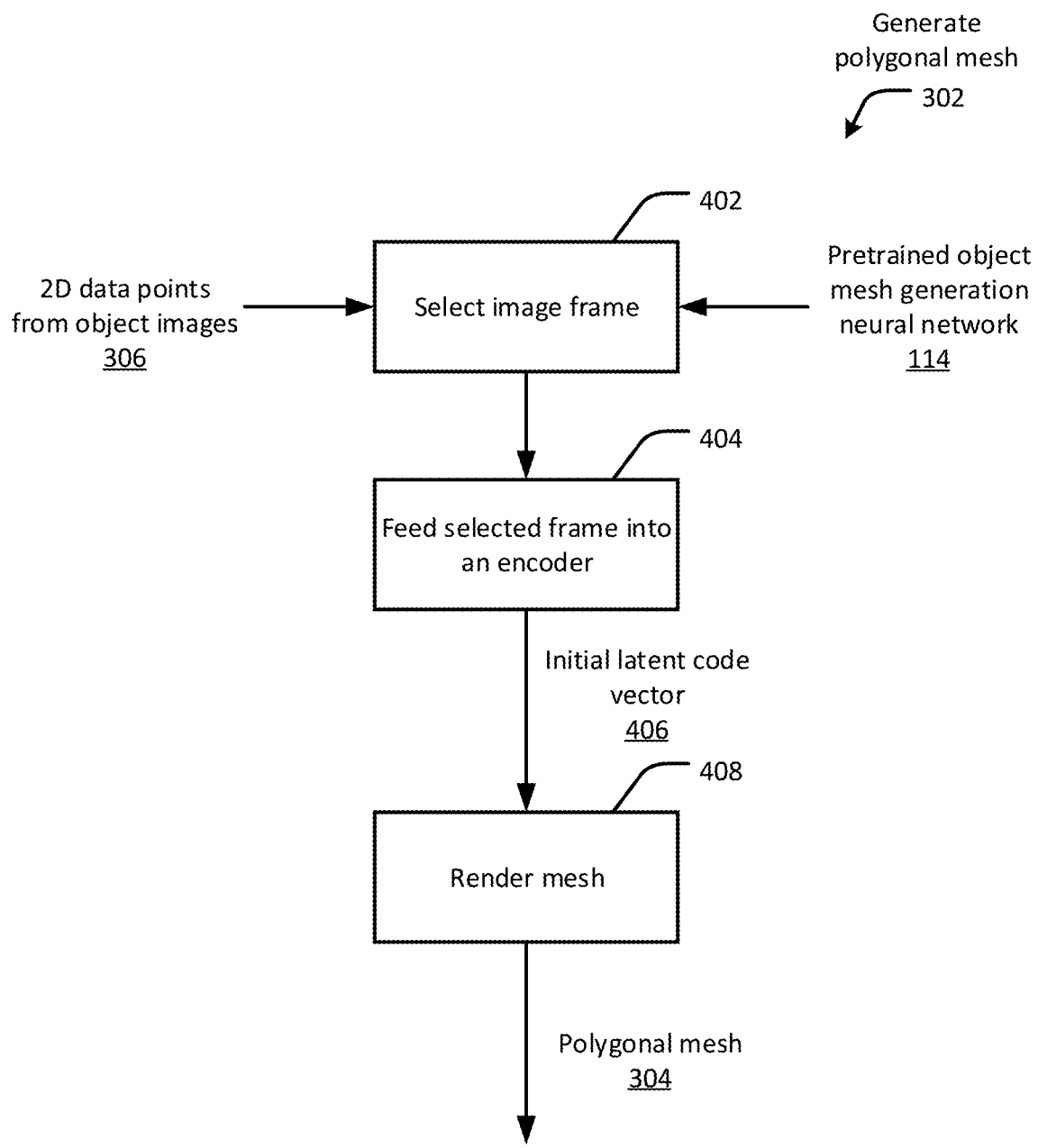
Figure 5:
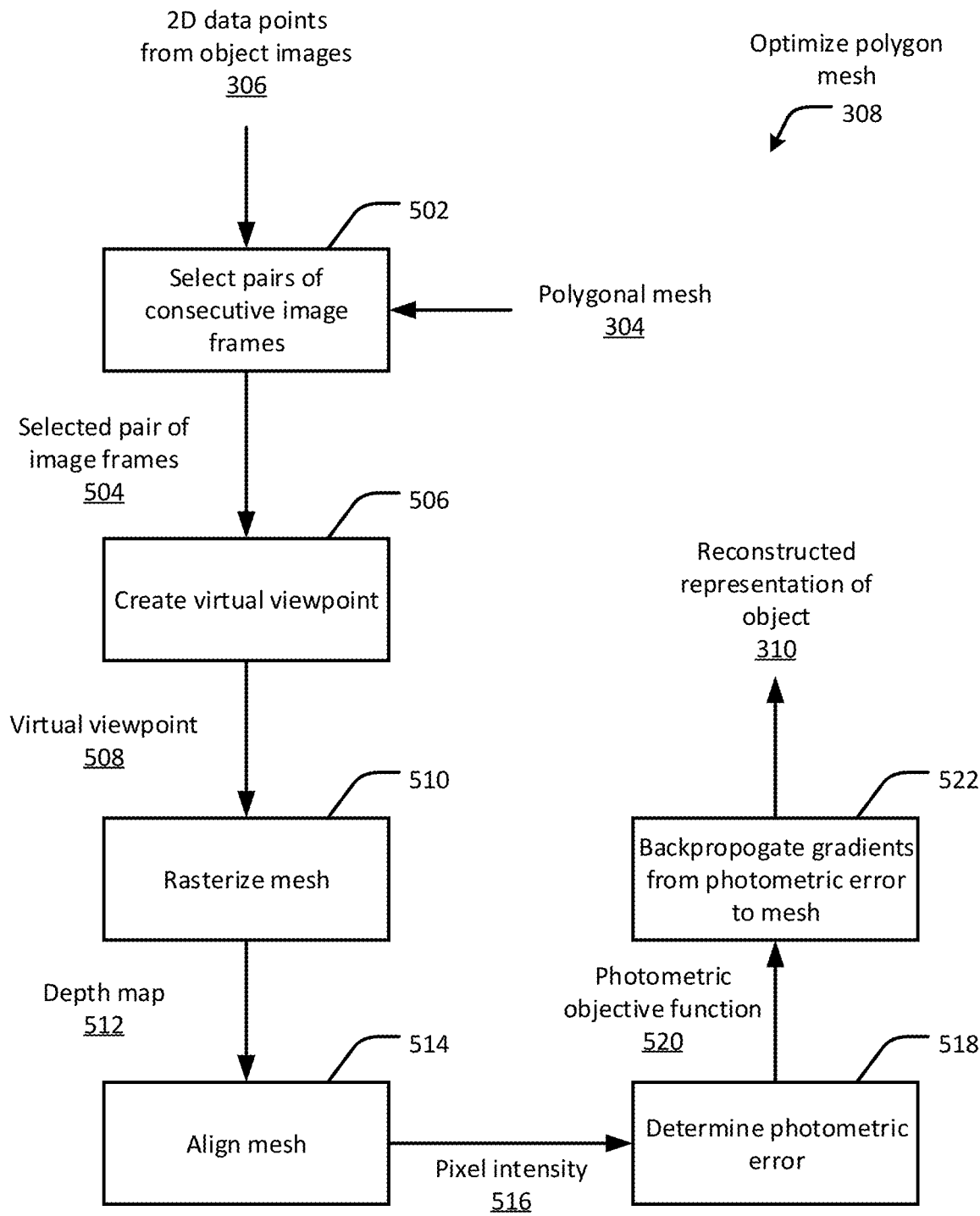

FIGS. 3-5 show flow diagrams of an example process 300 for 3D object reconstruction using photometric mesh representations, in accordance with an embodiment of the present disclosure. The process can be implemented, for example, in the image reconstruction application 130 of FIG. 1. The process 300 includes generating (302) a polygonal mesh 304 representing a shape of a first object in three dimensions. The mesh generation module 150 of FIG. 1 can, for example, be configured to generate the polygonal mesh 304. The mesh is generated using the object mesh generation neural network 114. The neural network 114 is trained to transform a set of two-dimensional (2D) data points 306 representing the first object into the polygon mesh. The set of 2D data points 306 represents color (RGB) pixels in at least two images of the first object. The images can be a series or sequence of still images, or frames of a video. The images have different camera poses in that the images provide differing viewing angles of the object, such as front, side, top, and so forth.

FIG. 4 shows a flow diagram of the process for generating (302) the polygonal mesh 304 in further detail. Initially, an image frame with the object centered is selected (402) from the image sequence or video in the form of RGB images paired with associated camera matrices. The image frame can be selected either manually or automatically. The selected frame is fed (404) into an encoder to get an initial latent code vector 406 as an output. For each frame and camera pair from the sequence, a polygonal (e.g., triangular) mesh is rendered (408) at the given viewpoints through mesh rasterization, which produces a rasterized map with polygonal (e.g., triangular) face indices (polygonal mesh 304).

Referring again to FIG. 3, the method 300 further includes optimizing (308) the polygonal mesh 304 over a set of latent feature vectors, or a code, using a photometric objective function. The mesh optimization module 152 of FIG. 1 can, for example, be configured to optimize the polygonal mesh. The set of latent feature vectors represent one or more pre-defined shapes of a second object, also referred to in this disclosure as a shape prior. In some cases, the second object is a model of the first object. For example, if the first object (the object in the images) is an office chair, the second object can be a structural model of the same type of office chair or a similarly shaped chair developed from a large set of previously validated data representing such chairs, as will be understood by one of skill in the art of computer vision and deep learning networks.

FIG. 5 shows a flow diagram of the process for optimizing (308) the polygonal mesh 304 in further detail. The mesh is optimized by first selecting (502) pairs of consecutive frames 504 from the image sequence. Next, for each pair of frames 504, a virtual viewpoint 508 is created (506) by taking the bisection of the corresponding rotations and camera centers. The mesh is then rasterized (510) to obtain a depth map from the virtual viewpoint. The depth map can be expressed as a set of 3D points that lie on the surface of the mesh. Next, the 3D mesh projections are aligned (514) by projecting the set of 3D points from the depth map to both selected viewpoints, from which pixel intensities 516 can be sampled. The photometric error is determined (518) from the difference between the RGB pixel intensities 516 sampled from both frames. Thus, a photometric objective function can be computed as a pixel-wise intensity error between both synthesized images. As described above, the photometric objective function represents, at least in part, a photometric loss contributed by pixels in each respective face of the mesh as a function of the image gradients obtained from the color (RGB) pixels. Gradients from the photometric error are then backpropagated (522) into the vertices of the assigned polygonal (e.g., triangular) indices by relating the barycentric coordinates of each image to update the latent code vector, thereby producing the reconstructed representation of the object 310 (reconstructed mesh). In some cases, the photometric objective function includes applying a parameterized warp function to pixels in the at least two images of the first object, such as discussed above. In some cases, the process 300 further includes causing 314 the reconstructed image of the first object to be displayed via a display device, for example, via the GUI 140 of FIG. 1. In some cases, the reconstructed image of the first object can be used to print a physical representation of the object using a 3D printer or other suitable device for forming a specimen of the object out of a physical material.

Referring again to FIG. 3, in some cases, the process 300 further includes training 316, by the at least one processor, the object mesh generation network to transform the set of 2D data points into the polygon mesh using 3D computer aided drawing (CAD) model renderings. The training module 154 of FIG. 1 can, for example, be configured to train the network. Such training is useful, for example, when additional validated shape priors are available to improve performance of the network for a given class of objects (for instance, for learning a new object).

Figure 6:
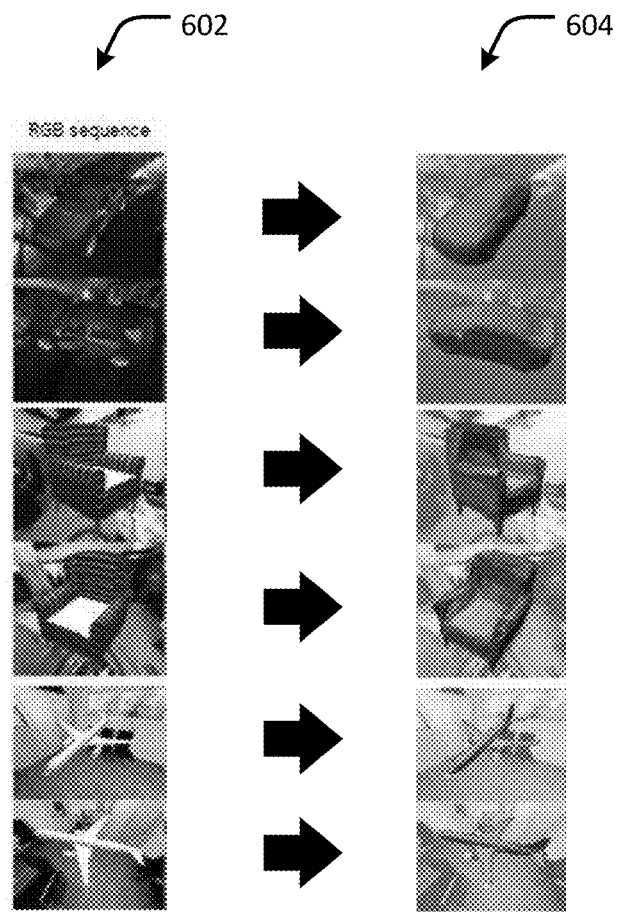
FIG. 6 is an example of quantitative results of a process for 3D object reconstruction, in accordance with an embodiment of the present disclosure.

FIG. 6 is an example of quantitative results using the process 300, showing a sequence of RGB images 602 and the corresponding reconstructed images 604. The disclose techniques can take advantage of multi-view geometry to resolve large misalignments and optimize for more accurate shapes. The high photometric error from the background between views discourages mesh vertices from staying in such regions. This serves as a natural force to constrain the mesh within the desired 3D regions, eliminating the need of additional depth or mask information during optimization.

Figure 7:
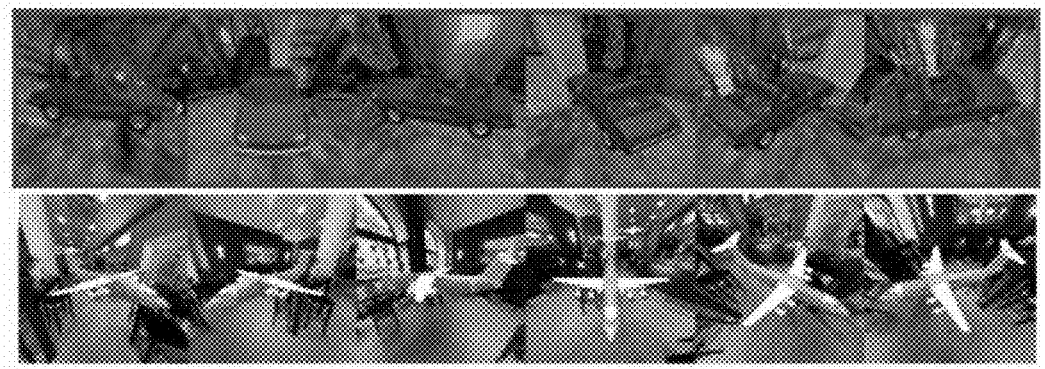
FIG. 7 shows example RGB sequences of objects on top of realistic textured backgrounds.

The disclosed techniques can be applied to both single and multiple object categories of image sequences, using synthetic data as well as real-world videos. Datasets of 3D CAD model renderings are generated for training a mesh generation network as well as for evaluating the optimization framework. The rendering pipeline aims to generate realistic images with complex backgrounds so then can be applied to real-world video sequences. A predefined object dataset can be used, and all objects are normalized to fit an origin-centered unit sphere. RGB images of each object are rendered using perspective cameras at, for example, 24 equally spaced azimuth angles and 3 elevation angles. To simulate more realistic backgrounds, spherical images from a database are randomly warped and cropped to create background images of the same scene taken at different camera viewpoints. By compositing the foreground and background images together at corresponding camera poses, RGB sequences of objects on top of realistic textured backgrounds are obtained, such as shown in FIG. 7.

During optimization, θ is initialized to 0 (identity transform), where the rotation component ω is parameterized with the so(3) Lie algebra. The code $z_0$ is initialized by encoding an RGB frame with the encoder: for synthetic sequences, frames at azimuth angle 45° are used; for real-world sequences, a frame is selected where the object is center-aligned to the image as much as possible to match the rendering settings. During optimization, two consecutive frames are selected as the image pair and a stochastic strategy of randomly selecting 8 pairs per iteration is used.

Figure 8:
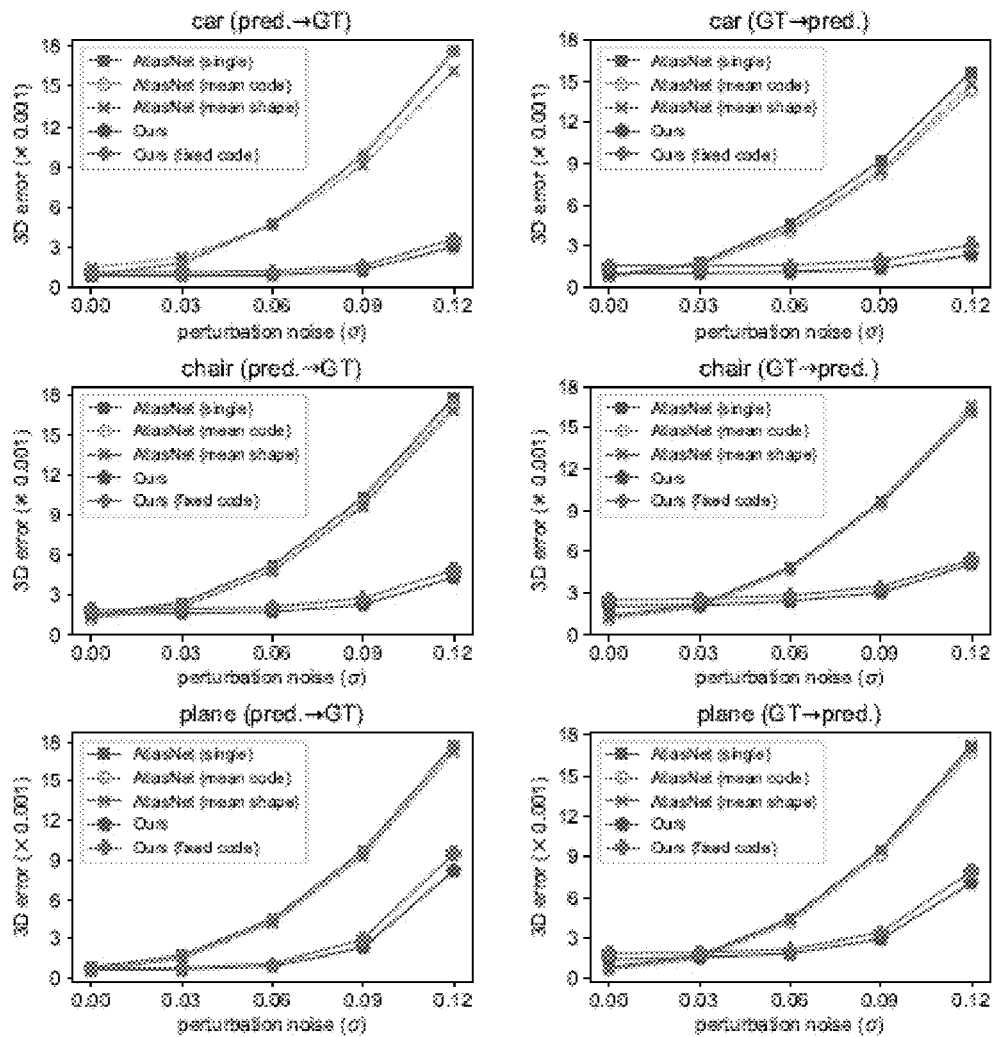
FIG. 8 shows an example of category specific performance to noise in coordinate system mapping, in accordance with an embodiment of the present disclosure.

FIG. 8 shows examples of category specific performance to noise in coordinate system mapping when applying the disclosed techniques to the input image sequences.

Numerous embodiments will be apparent in light of the present disclosure, and features described herein can be combined in any number of configurations. One example embodiment provides, in a digital medium environment for editing digital images, a computer-implemented method of three-dimensional object reconstruction. The method includes generating, by at least one processor, a polygon mesh representing a shape of a first object in three dimensions using an object mesh generation neural network trained to transform a set of two-dimensional (2D) data points representing the first object into the polygon mesh. The set of 2D data points represent color pixels in at least two images of the first object. The at least two images have different camera poses. The method further includes optimizing, by the at least one processor, the polygon mesh over a set of latent feature vectors using a photometric objective function to produce a reconstructed representation of the first object, the set of latent feature vectors representing a pre-defined shape of a second object, and causing, by the at least one processor, the reconstructed representation of the first object to be output to an output device. In some cases, the method includes training, by the at least one processor, the object mesh generation network to transform the set of 2D data points into the polygon mesh using 3D computer aided drawing (CAD) model renderings. In some cases, the second object is a model of the first object. In some cases, the photometric objective function represents, at least in part, a photometric loss contributed by pixels in the at least one face of the polygon mesh. In some cases, the photometric objective function includes applying a parameterized warp function to pixels in the at least two images of the first object. In some cases, the photometric objective function is:

$$\mathcal{L}_{phot}^{(j)}(V_j) = \sum_{i:x_i \in \mathcal{X}_j} \|I_S(x'_i) - I_T(x_i)\|_1$$

where $x'_i = \mathcal{W}(x_i; V_j)$ is a warped pixel coordinate $x_i$ in a polygon mesh V of a first image $I_S$ of the first object, $I_T$ is a second image of the first object, V is the polygon mesh, and $\mathcal{X}_j$ is a set of visible pixel coordinates within a projection range of the at least one face j of the polygon mesh. In some cases, the optimizing includes applying a scale penalty to the optimization loss function. In some cases, the output device includes at least one of a display device for displaying the reconstructed representation of the first object and a 3D printer device for 3D printing of the reconstructed representation of the first object. In some cases, the output device includes a memory device for storing the reconstructed representation of the first object. Another example embodiment provides a computer program product including one or more non-transitory machine-readable mediums having instructions encoded thereon that when executed by one or more processors cause the one or more computer processors to perform a process such as set forth in this paragraph.

Another example embodiments provides a system for 3D object reconstruction using photometric mesh representations. The system includes at least one processor, and a storage operatively coupled to the at least one processor and for storing instructions that when executed by the at least one processor cause the at least one processor to generate a polygon mesh representing a shape of a first object in three dimensions using an object mesh generation neural network trained to transform a set of two-dimensional (2D) data points representing the first object into the polygon mesh. The set of 2D data points represents color pixels in at least two images of the first object. The at least two images have different camera poses. In some cases, the instructions cause the at least one processor to optimize the polygon mesh over a set of latent feature vectors using a photometric objective function to produce a reconstructed representation of the first object, the set of latent feature vectors representing a pre-defined shape of a second object, and cause the reconstructed representation of the first object to be at least one of displayed via a display device and printed via a 3D printing device. In some cases, the second object is a model of the first object. In some cases, the photometric objective function represents, at least in part, a photometric loss contributed by pixels in the at least one face of the polygon mesh. In some cases, the photometric objective function includes applying a parameterized warp function to pixels in the at least two images of the first object. In some cases, the photometric objective function is:

$$\mathcal{L}_{phot}^{(j)}(V_j) = \sum_{i:x_i \in X_j} \|I_S(x'_i) - I_T(x_i)\|_1$$

where $x'_i = \mathcal{W}(x_i; V_j)$ is a warped pixel coordinate $x_i$ in a polygon mesh V of a first image $I_S$ of the first object, $I_T$ is a second image of the first object, V is the polygon mesh, and $X_j$ is a set of visible pixel coordinates within a projection range of the at least one face j of the polygon mesh. In some cases, the optimizing includes applying a scale penalty to the optimization loss function.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. In a digital medium environment for editing digital images, a computer-implemented method of three-dimensional object reconstruction, the method comprising:
   generating, by at least one processor, a polygon mesh representing a shape of a first object in three dimensions using an object mesh generation neural network trained to transform a set of two-dimensional (2D) data points representing the first object into the polygon mesh, the set of 2D data points representing color pixels in at least two images of the first object, the at least two images having different camera poses;
   optimizing by the at least one processor, the polygon mesh over a set of latent feature vectors using a photometric objective function to produce a reconstructed representation of the first object, the set of latent feature vectors representing a pre-defined shape of a second object; and
   causing, by the at least one processor, the reconstructed representation of the first object to be output to an output device.

2. The method of claim 1, further comprising training, by the at least one processor, the object mesh generation neural network to transform the set of 2D data points into the polygon mesh using 3D computer aided drawing (CAD) model renderings.

3. The method of claim 1, wherein the second object is a model of the first object.

4. The method of claim 1, wherein the photometric objective function represents, at least in part, a photometric loss contributed by pixels in the at least one face of the polygon mesh.

5. The method of claim 1, wherein the photometric objective function includes applying a parameterized warp function to pixels in the at least two images of the first object.

6. The method of claim 1, wherein the photometric objective function is:

$$\mathcal{L}_{phot}^{(j)}(V_j) = \sum_{i:x_i \in X_j} \|I_S(x'_i) - I_T(x_i)\|_1$$

where $x'_i = \mathcal{W}(x_i; V_j)$ is a warped pixel coordinate $x_i$ in a polygon mesh V of a first image $I_S$ of the first object, $I_T$ is a second image of the first object, V is the polygon mesh, and $X_j$ is a set of visible pixel coordinates within a projection range of the at least one face j of the polygon mesh.

7. The method of claim 1, wherein the optimizing includes applying a scale penalty to the photometric objective function.

8. The method of claim 1, wherein the output device includes at least one of a display device for displaying the reconstructed representation of the first object and a 3D printer device for 3D printing of the reconstructed representation of the first object.

9. The method of claim 1, wherein the output device includes a memory device for storing the reconstructed representation of the first object.

10. A computer program product including one or more non-transitory machine-readable mediums having instructions encoded thereon that when executed by at least one processor causes a process for 3D object reconstruction using photometric mesh representations to be carried out, the process comprising:
    generating, by the at least one processor, a polygon mesh representing a shape of a first object in three dimensions using an object mesh generation neural network trained to transform a set of two-dimensional (2D) data points representing the first object into the polygon mesh, the set of 2D data points representing color pixels in at least two images of the first object, the at least two images having different camera poses;
    optimizing, by the at least one processor, the polygon mesh over a set of latent feature vectors using a photometric objective function to produce a reconstructed representation of the first object, the set of latent feature vectors representing a pre-defined shape of a second object; and
    causing by the at least one processor, the reconstructed representation of the first object to be at least one of displayed via a display device and printed via a 3D printing device.

11. The computer program product of claim 10, wherein the process includes training, by the at least one processor, the object mesh generation neural network to transform the set of 2D data points into the polygon mesh using 3D computer aided drawing (CAD) model renderings.

12. The computer program product of claim 10, wherein the photometric objective function represents, at least in part, a photometric loss contributed by pixels in the at least one face of the polygon mesh.

13. The computer program product of claim 10, wherein the photometric objective function includes applying a parameterized warp function to pixels in the at least two images of the first object.

14. The computer program product of claim 10, wherein the photometric objective function is:

$$\mathcal{L}_{phot}^{(j)}(V_j) = \sum_{i:x_i \in X_j} \|I_S(x'_i) - I_T(x_i)\|_1$$

where $x'_i = \mathcal{W}(x_i; V_j)$ is a warped pixel coordinate $x_i$ in a polygon mesh V of a first image $I_S$ of the first object, $I_T$ is a second image of the first object, V is the polygon mesh, and $\mathcal{X}_j$ is a set of visible pixel coordinates within a projection range of the at least one face j of the polygon mesh.

15. A system for 3D object reconstruction using photometric mesh representations, the system comprising:
at least one processor; and
a storage operatively coupled to the at least one processor and for storing instructions that when executed by the at least one processor cause the at least one processor to
generate a polygon mesh representing a shape of a first object in three dimensions using an object mesh generation neural network trained to transform a set of two-dimensional (2D) data points representing the first object into the polygon mesh, the set of 2D data points representing color pixels in at least two images of the first object, the at least two images having different camera poses;
optimize the polygon mesh over a set of latent feature vectors using a photometric objective function to produce a reconstructed representation of the first object, the set of latent feature vectors representing a pre-defined shape of a second object; and
cause the reconstructed representation of the first object to be at least one of displayed via a display device and printed via a 3D printing device.

16. The system of claim 15, wherein the second object is a model of the first object.

17. The system of claim 15, wherein the photometric objective function represents, at least in part, a photometric loss contributed by pixels in the at least one face of the polygon mesh.

18. The system of claim 15, wherein the photometric objective function includes applying a parameterized warp function to pixels in the at least two images of the first object.

19. The system of claim 15, wherein the photometric objective function is:

$$\mathcal{L}_{phot}^{(j)}(V_j) = \sum_{i: x_i \in \mathcal{X}_j} \|I_S(x'_i) - I_T(x_i)\|_1$$

where $x'_i = \mathcal{W}(x_i; V_j)$ is a warped pixel coordinate $x_i$ in a polygon mesh V of a first image $I_S$ of the first object, $I_T$ is a second image of the first object, V is the polygon mesh, and $\mathcal{X}_j$ is a set of visible pixel coordinates within a projection range of the at least one face j of the polygon mesh.

20. The system of claim 15, wherein the optimizing includes applying a scale penalty to the photometric objective function.

* * * * *